Patented July 13, 1954

2,683,747

UNITED STATES PATENT OFFICE 2,683,747

SEPARATION OF TRANS, TRANS PENTAENALS BY FORMATION OF CRYSTALLIZABLE COMPLEX WITH HYDROQUINONE

Charles H. Benton, Jr., and Charles D. Robeson, Rochester, N. Y., assignors to Eastman Kodak Company, Rochester, N. Y., a corporation of New Jersey No Drawing. Application March 5, 1952, Serial No. 275,032

9 Claims. (Cl. 260—598)

This invention relates to the separation of trans,trans pentaenals from mixtures containing such compounds and to crystallizable complexes of such pentaenals. More particularly, the invention is concerned with separating 2,6-trans,-trans pentaene aldehydes having the vitamin A carbon skeleton from admixture with closely related materials by selective complex formation.

Vitamin A-active materials have the structure

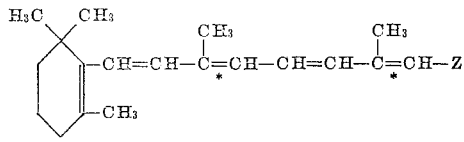

wherein Z can be an alcohol group —$CH_2OH$; an ether group —$CH_2OR$; an ester group —COOR; a carboxyl group —COOH or the like, R being a hydrocarbon radical. Such materials exhibit highest biological activity when the material has a trans configuration around each of the olefinic double bonds in the 2 and 6 positions as starred in the above formula.

Vitamin A aldehyde is a highly active form of vitamin A and is readily reduced to vitamin A alcohol which can then be esterified to any desired ester such as the acetate, palmitate or the like. When materials having the vitamin A aldehyde carbon skeleton are synthesized, they are often obtained as mixtures of trans,trans pentaenals with one or more of the lower potency cis forms such as the cis,cis; cis,trans; or trans,cis forms. In such cases, it is desirable to be able to separate out the trans,trans aldehyde in purified form, a separation which is normally infeasible by usual separation methods because of the closely related constitution of the components. The trans,trans pentaenal commonly is present either as vitamin A aldehyde itself having the formula

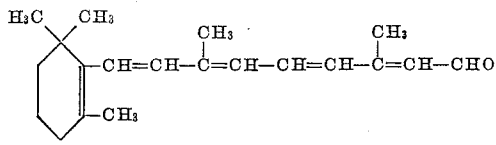

or as an isomeric trans,trans vitamin A aldehyde having a $\lambda_{max.}=328m\mu$ and appearing to have the formula

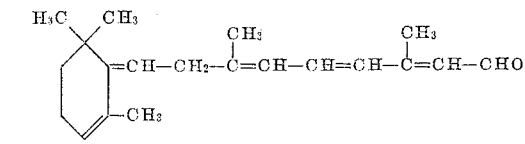

the latter isomer being readily converted to 2,6-trans,trans vitamin A aldehyde by catalysis with a base such as an alkali or an amine.

It is accordingly an object of this invention to provide a new and highly effective method of separating trans,trans pentaenals having the vitamin A aldehyde carbon skeleton from mixtures containing such pentaenals.

It is a further object of the invention to separate trans,trans pentaenals having the vitamin A aldehyde carbon skeleton from closely related materials having the same carbon skeleton but having a cis configuration around at least one of the olefinic double bonds in the 2 and 6 positions.

Another object of the invention is to provide new crystallizable complexes of trans,trans pentaenals having the vitamin A aldehyde carbon skeleton.

Another object of the invention is to provide a method for selectively forming crystallizable complexes of trans,trans vitamin A aldehyde or trans,trans isomers thereof in the presence of cis forms of vitamin A aldehyde.

Another object of the invention is to provide a simple method of obtaining highly concentrated trans,trans vitamin A-active materials from impure mixtures containing materials of lower activity.

Another object of the invention is to provide a readily crystallizable selective complex of 2,6-trans,trans vitamin A aldehyde.

Another object of the invention is to provide a crystalline trans,trans vitamin A aldehyde derivative which can be readily converted to pure trans,trans vitamin A aldehyde.

Other objects will be apparent from the description and claims which follow.

These and other objects are attained by means of the invention hereinafter described. We have discovered that hydroquinone selectively forms crystallizable complexes with 2,6-trans,trans vitamin A aldehyde and its trans,trans isomers in high yield, but does not form crystallizable complexes with the cis forms of vitamin A aldehyde such as 2,6-cis,cis vitamin A aldehyde, 2-cis-6-trans vitamin A aldehyde, and 2-trans-6-cis vitamin A aldehyde, nor with vitamin A alcohol nor β-ionylidene acetaldehyde.

The hydroquinone complex is readily formed by adding hydroquinone to a solution of the trans, trans aldehyde in an inert polar solvent such as ether, acetonitrile, methyl ethyl ketone, alcohol or similar well-known organic solvent, or by adding the hydroquinone directly to a mixture containing the trans,trans aldehyde if such mixture is liquid. The complex formation proceeds readily at room temperature but the hydroquinone is desirably added in warm solvent because of its low solubility. The complex can be readily crystallized out of solution in such solvents by usual methods such as by concentrating the solution or by cooling it; or the entire reaction mixture can be evaporated to the solid state and the uncomplexed components leached away from the crystalline complex with a suitable solvent such as petroleum ether. The exact nature of the complex is not known but the complex is formed in the ratio of two moles of aldehyde to one mole of hydroquinone. The separation of the complex from the reaction mixture can be effected by any of the well-known separation techniques such as solvent partition or the like, but is conveniently effected by crystallization of the complex from solution by addition of a non-polar solvent such as petroleum ether, benzene or similar low-boiling petroleum fraction. If desired, the vitamin A aldehyde is readily regenerated from the complex by washing an ether solution of the complex with dilute alkali which washes out the hydroquinone. The solubility of the hydroquinone-trans,trans vitamin A aldehyde complex in various solvents at 25° C. is shown in Table 1.

TABLE 1

| Solvent | Solubility of complex g./100 cc. at 25° C. |
| --- | --- |
| Isopropyl alcohol | 4.95 |
| Ethyl ether | 3.65 |
| Acetonitrile | 3.6 |
| Methanol | 3.2 |
| Benzene | 2.1 |
| Isopropyl ether | 1.6 |
| n-Butyl ether | 1.5 |
| Petroleum ether-ethyl ether (2:3) | 1.58 |
| Petroleum ether-ethyl ether (3:2) | 1.27 |
| Petroleum ether-ethyl ether (4:1) | 0.45 |

The invention is illustrated by the following examples of preferred embodiments thereof.

*Example 1*

An 0.8 g. portion of crystalline 2,6-trans,trans vitamin A aldehyde was dissolved in 25 cc. of ethyl ether. To the resulting solution was added 0.3 g. of hydroquinone in 25 cc. of ethyl ether. The solution was concentrated to about 15 cc., and, at 25° C., 0.67 g. of 2,6-trans,trans vitamin A aldehyde-hydroquinone complex crystallized out as yellow-orange crystals having a melting point of 137.5-138.4° C. and $$E_{1\ cm.}^{1\%}(381\ m\mu) = 1250$$

in alcohol.

*Example 2*

Five grams of vitamin A aldehyde containing approximately 50% by weight of 2,6-trans,trans vitamin A aldehyde and about 50% by weight of a mixture of 2-trans-6-cis, 2,6-cis,cis and 2-cis-6-trans vitamin A aldehydes was treated with a warm solution of 0.97 g. of hydroquinone in 30 cc. of isopropyl ether and the product was allowed to crystallize at room temperature. The yellow crystals of the hydroquinone complex of 2,6-trans,trans vitamin A aldehyde which precipitated, after being washed with isopropyl ether, weighed 2.15 g. and had $$E_{1\ cm.}^{1\%}(380\ m\mu) = 1120$$

The yield of trans,trans complex was 40.8% on the basis of the total aldehyde content of the mixture or approximately 82% of the total tran,trans aldehyde.

*Example 3*

Five grams of the vitamin A aldehyde mixture, such as was used in the preceding example, was dissolved in 5 cc. of diethyl ether and to the resulting solution was added 10 cc. of warm diethyl ether containing 0.97 g. of hydroquinone. The ether was then blown off under nitrogen and the residual solid was triturated with 40 cc. of petroleum ether. After standing for 45 minutes at room temperature, 2.96 g. of light yellow crystals of the hydroquinone complex of 2,6-trans,trans vitamin A aldehyde were filtered off. The crystalline product had $$E_{1\ cm.}^{1\%}(380\ m\mu) = 898$$

and the yield was 45.3% of the total aldehydes.

*Example 4*

Under acid conditions, vitamin A aldehyde is isomerized to an isomeric form having $E_{max.} = 328$ m$\mu$ and appearing to have the formula

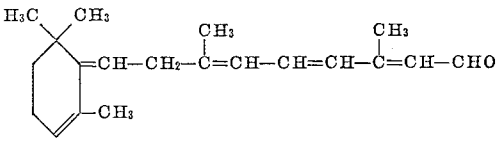

Two grams of a mixture of cis and trans forms of vitamin A aldehyde was dissolved in 10 ml. of ether containing 0.55 ml. of 4.88 N. alcoholic hydrochloric acid and 0.77 g. of hydroquinone, under which conditions the aldehyde is present in the isomeric form. A precipitate having $$E_{1\ cm.}^{1\%}(328\ m\mu) = 1008$$

was obtained which appeared to be the hydroquinone complex of 2,6-trans,trans vitamin A aldehyde as the 328 m$\mu$ isomer. This was verified by dissolving 0.2 g. of the crystalline product in ether and washing the solution three times with 0.5 N. potassium hydroxide and four times with water. The aqueous alkali was effective to wash out the hydroquinone from the complex and also to isomerize the isomeric aldehyde to vitamin A aldehyde. The product weighing 0.18 g. was identified as 2,6-trans,trans vitamin A aldehyde having $$E_{1\ cm.}^{1\%}(380\ m\mu) = 1303$$

Thus, by means of this invention, 2,6-trans,-trans pentaenals having the vitamin A aldehyde carbon skeleton are readily separated from mixtures containing closely related but less desirable materials such as the cis forms of vitamin A aldehyde. The complex is obtained in crystalline form, and the pure 2,6-trans,trans vitamin A aldehyde is readily regenerated from the complex by washing with alkali.

Although the invention has been described in considerable detail with reference to certain preferred embodiments thereof, it will be understood that variations and modifications can be effected within the spirit and scope of the invention as described hereinabove and as defined in the appended claims.

We claim:

1. As a new chemical compound, a crystallizable complex of hydroquinone with a trans,-trans pentaene aldehyde having the carbon skeleton and chemical composition of vitamin A aldehyde, said complex being the product obtained by reacting two molar proportions of said aldehyde with one molar proportion of said hydroquinone.

2. As a new chemical compound, a crystallizable complex of one molar proportion of hydroquinone with two molar proportions of a trans,-trans pentaene aldehyde selected from the group consisting of

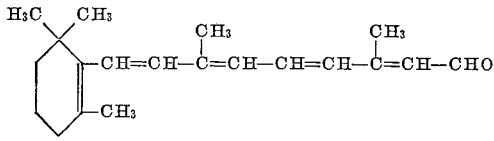

and

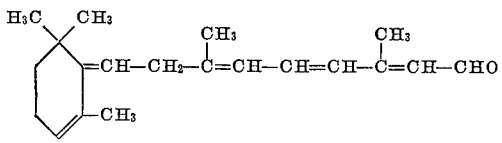

3. As a new chemical compound, a crystallizable complex obtained as the product of reacting one molar proportion of hydroquinone with two molar proportions of 2,6-trans,trans vitamin A aldehyde of the formula

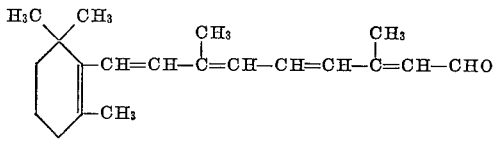

4. As a new chemical compound, a crystallizable complex of one molar proportion of hydroquinone with two molar proportions of a 2,6-trans,trans isomeric vitamin A aldehyde of the formula

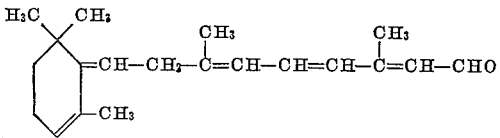

5. The method which comprises admixing hydroquinone and a mixture containing a 2,6-trans,trans pentaenal having the carbon skeleton and chemical composition of vitamin A aldehyde and thereby selectively forming a hydroquinone complex of said pentaenal, and separating said complex from said mixture.

6. The method which comprises admixing hydroquinone with a mixture containing at least one trans,trans pentaene aldehyde selected from the group consisting of

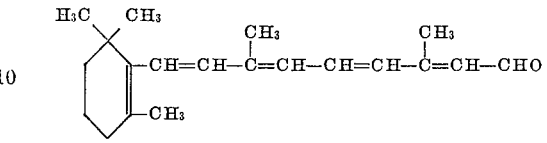

and

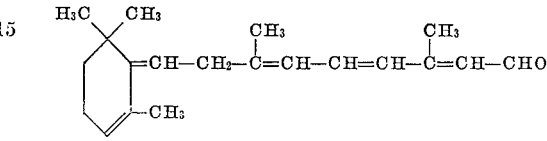

and thereby forming a hydroquinone complex of said pentaene aldehyde, and separating said complex from said mixture.

7. The method which comprises mixing together hydroquinone and a mixture containing a 2,6-trans,trans pentaenal having the vitamin A aldehyde chemical composition and carbon skeleton admixed with a pentaenal having the vitamin A aldehyde chemical composition and carbon skeleton but having a cis configuration with respect to at least one of the olefinic double bonds in the 2 and 6 positions, said hydroquinone being effective to selectively form a crystallizable complex with said 2,6-trans,trans pentaenal, and separating said complex from said mixture.

8. The method which comprises mixing together hydroquinone and a mixture containing 2,6-trans,trans vitamin A aldehyde admixed with a cis isomer thereof and thereby selectively forming a hydroquinone complex with said 2,6-trans,-trans vitamin A aldehyde, and crystallizing said complex from said mixture.

9. The method which comprises mixing together hydroquinone and a mixture containing a 2,6-trans,trans pentaenal of the formula

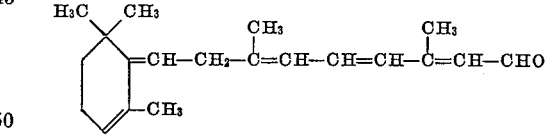

in admixture with a cis isomer of said pentaenal and thereby forming a hydroquinone complex of said 2,6-trans,trans pentaenal, and crystallizing said complex from said mixture.

References Cited in the file of this patent

UNITED STATES PATENTS

| Number | Name | Date |
|---|---|---|
| 2,586,305 | Copenhaver | Feb. 19, 1952 |
| 2,586,306 | Copenhaver | Feb. 19, 1952 |